United States Patent
Crayssac et al.

(10) Patent No.: US 10,197,340 B2
(45) Date of Patent: Feb. 5, 2019

(54) EXCHANGER ELEMENT FOR A HEAT EXCHANGER, HEAT EXCHANGER COMPRISING SUCH AN EXCHANGER ELEMENT AND METHOD FOR THE PRODUCTION OF SUCH AN EXCHANGER ELEMENT

(71) Applicant: L'Air Liquide, Societe Anonyme pour l'Etude et l'Exploitation des Procedes Georges Claude, Paris (FR)

(72) Inventors: Frederic Crayssac, Velizy (FR); Marc Wagner, Saint Maur des Fosses (FR)

(73) Assignee: L'Air Liquide Societe Anonyme Pour l'Etude Et l'Exploitation Des Procedes Georges Claude, Paris (FR)

( * ) Notice: Subject to any disclaimer, the term of this patent is extended or adjusted under 35 U.S.C. 154(b) by 631 days.

(21) Appl. No.: 14/426,317

(22) PCT Filed: Sep. 2, 2013

(86) PCT No.: PCT/FR2013/052009
§ 371 (c)(1),
(2) Date: Mar. 5, 2015

(87) PCT Pub. No.: WO2014/037656
PCT Pub. Date: Mar. 13, 2014

(65) Prior Publication Data
US 2015/0211809 A1    Jul. 30, 2015

(30) Foreign Application Priority Data
Sep. 5, 2012 (FR) .................................... 12 58284

(51) Int. Cl.
*F28F 3/02* (2006.01)
*F28D 9/00* (2006.01)
*B23P 15/26* (2006.01)

(52) U.S. Cl.
CPC ................ *F28F 3/02* (2013.01); *B23P 15/26* (2013.01); *F28D 9/0037* (2013.01); *Y10T 29/4935* (2015.01)

(58) Field of Classification Search
CPC . F28D 9/0037; F28F 3/02; F28F 3/046; F28F 3/048
See application file for complete search history.

(56) References Cited

U.S. PATENT DOCUMENTS 1,662,870 A    10/1924  Stancliffe
4,438,809 A  *  3/1984  Papis .................... F28D 9/0018
                                                      165/166

(Continued)

FOREIGN PATENT DOCUMENTS

DE    198 01 374    3/1999
EP    2 431 700     3/2012

(Continued)

OTHER PUBLICATIONS

French Search Report for FR 1258284, dated Jul. 24, 2013.

*Primary Examiner* — Tho V Duong
(74) *Attorney, Agent, or Firm* — Justin K. Murray

(57) ABSTRACT

Embodiments of the invention relate to an exchanger element having a solid plate and ribs on the plate in order to form exchange channels configured to heat or cool fluid, and distribution channels that extend transversely to the exchange channels.

14 Claims, 2 Drawing Sheets

(56) References Cited

U.S. PATENT DOCUMENTS

| | | | | |
|---|---|---|---|---|
| 4,749,032 | A * | 6/1988 | Rosman | F28D 9/0018 |
| | | | | 165/166 |
| 5,851,636 | A * | 12/1998 | Lang | A01K 67/027 |
| | | | | 156/290 |
| 6,951,245 | B1 | 10/2005 | Lehman | |
| 9,689,620 | B2 * | 6/2017 | Yamada | F28D 9/0006 |
| 2006/0090887 | A1 * | 5/2006 | Kato | F28D 9/005 |
| | | | | 165/166 |
| 2007/0221366 | A1 * | 9/2007 | Murayama | F28D 9/0037 |
| | | | | 165/166 |
| 2007/0298486 | A1 * | 12/2007 | Arora | B01J 19/0093 |
| | | | | 435/287.1 |
| 2010/0071887 | A1 * | 3/2010 | Sugiyama | F24F 12/006 |
| | | | | 165/166 |

FOREIGN PATENT DOCUMENTS

| WO | WO 88 06941 | 9/1988 |
|---|---|---|
| WO | WO 97 24572 | 7/1997 |

\* cited by examiner

EXCHANGER ELEMENT FOR A HEAT EXCHANGER, HEAT EXCHANGER COMPRISING SUCH AN EXCHANGER ELEMENT AND METHOD FOR THE PRODUCTION OF SUCH AN EXCHANGER ELEMENT

CROSS REFERENCE TO RELATED APPLICATIONS

This application is a § 371 of International PCT Application PCT/FR2013/052009, filed Sep. 2, 2013, which claims the benefit of FR1258284, filed Sep. 5, 2012, both of which are herein incorporated by reference in their entireties.

TECHNICAL FIELD OF THE INVENTION

The present invention relates to an exchanger element for a heat exchanger intended to transfer heat from at least one primary fluid referred to as a calorigenic fluid to at least one secondary fluid referred to as a frigorigenic fluid. In addition, the present invention relates to a heat exchanger for a cryogenic gas separation unit comprising several exchanger elements according to the invention. Moreover, the present invention relates to a method of manufacture for manufacturing such an exchanger element.

The present invention notably finds an application in the field of cryogenic gas separation, particularly the field of cryogenic air separation (known by the English-language acronym "ASU" which stands for air separation unit) put to use for the production of pressurized gaseous oxygen.

BACKGROUND

U.S. Pat. No. 6,951,245B1 describes a heat exchanger for transferring heat from a calorigenic fluid to a frigorigenic fluid. The heat exchanger comprises several plates, ribs extending as a projection on each plate, and closure bars extending around the plates.

The function of the plates is to support the ribs and to channel calorigenic or frigorigenic fluid. The ribs have the function of forming channels for the flow of calorigenic or frigorigenic fluid. The peripheral closure bars have the function of closing off the channels.

In the heat exchanger of U.S. Pat. No. 6,951,245B1, the plates, the ribs and the closure bars are joined together by means of brazing. In other words, the ribs and the closure bars are brazed to the plates.

However, such a heat exchanger of the prior art presents risks of manufacturing defects because it is difficult to gain full mastery of the brazing process. In particular, certain brazed joints may prove defective. Such manufacturing defects lead to risks of the heat exchanger failing. These risks of failure increase with the service pressure intended for the fluids. For certain applications, the fluids may reach a pressure of between 50 bar and 100 bar.

Furthermore, when cryogenically separating air in a heat exchanger made of aluminum alloy, the flow of oxygen at high pressure may cause the aluminum alloy to ignite directly at a hot spot created locally by a plastic deformation, a break in the brazing, particle impact, friction from the flow, etc. Now, the risk of direct ignition increases with service pressure.

SUMMARY OF THE INVENTION

The present invention therefore notably seeks to solve, in full or in part, the problems mentioned hereinabove.

To this end, one subject of the invention is an exchanger element for a heat exchanger intended to transfer heat from at least one primary fluid referred to as a calorigenic fluid to at least one secondary fluid referred to as a frigorigenic fluid, the exchanger element comprising:
  at least one plate which is solid;
  ribs which extend as a projection on at least one face of the plate, each rib forming at least one portion of a wall of a respective channel designed for the flow of calorigenic fluid or frigorigenic fluid; and
  closure bars extending along the edges of the plate so as to close off at least part of the channels;
  the exchanger element being characterized in that the plate, at least part of the ribs and at least part of the closure bars are of one piece.

In other words, the plate, at least part of the ribs and at least part of the closure bars are made as a single piece, therefore made of one single same material. The components of the exchanger element are therefore of one piece, and require little or no brazing.

Thus, such an exchanger element has very high mechanical strength allowing the heat exchanger to operate at calorigenic fluid and/or frigorigenic fluid pressures in excess of 50 bar A, even 80 bar A, or even 100 bar A. Furthermore, as such an exchanger element comprises few if any brazed joints, the risk of direct ignition is reduced in the case of air separation.

In this application, the term "solid" refers to a plate which is massive, i.e. has no hollows or cavities.

According to the invention, the plate, all the ribs and all the closure bars are of one piece.

U.S. Pat. No. 1,662,870 introduces an exchanger element according to the preamble of claim 1 but does not have distribution channels allowing an exchange of fluids.

According to one subject of the invention, there is provided an exchanger element as claimed in any of the claims herein.

Thus, such an exchanger element has particularly high mechanical strength which allows the heat exchanger to operate at calorigenic fluid and/or frigorigenic fluid pressures in excess of 50 bar A, even 80 bar A, or even 100 bar A.

According to an alternative form of the preceding embodiment, the closure bars are arranged in such a way that all the edges of the plate have at least one closure bar running along them. Thus, the heat exchanger is sealed along each of its edges by closure bars which are of one piece and therefore mechanically strong.

According to one embodiment of the invention, the plate has the overall shape of a rectangle, the exchanger element comprising four closure bars respectively running along the four edges of the plate.

Thus, with rectangular plates, the heat exchanger has plane faces formed by the stack of the rectilinear edges of the plates, making it simpler to assemble with the fluid inlet headers and fluid outlet headers.

According to one embodiment of the invention, just one face of the plate comprises ribs.

Thus, the manufacturing tolerance on each rib is relatively high because the ribs of the exchange element are directly in contact with the plate of the superposed exchange element.

According to one embodiment of the invention, both faces of the plate comprise ribs.

Thus, such an exchange element has a high ribs density and therefore offers large surface areas for the exchange of heat.

According to one form of embodiment of the previous embodiment, the ribs of the first face are offset with respect to the ribs of the second face, the ribs preferably being uniformly distributed over each face.

In other words, the ribs of the first face are not situated in line with the ribs of the second face.

Thus, such an offset arrangement of the ribs means that the heat exchanger can achieve a very high ribs density. This is because two consecutive exchanger elements can be superposed with their respective ribs separated, thus forming numerous channels.

According to one alternative form of the invention, the ribs have rectangular and mutually similar cross sections.

According to one alternative form of the invention, grooves have a cross section that can vary according to the mode of manufacture (mechanical machining, rolling or chemical machining).

Thus, such ribs have shapes that are relatively simple to achieve.

According to one alternative form of the invention, on a first face of the plate, two consecutive ribs are distant by a first spacing, and on a second face of the plate, two consecutive ribs are distant by a second spacing which is greater than the first spacing, preferably comprised between 1 times and 2 times the first spacing. Thus, such ribs make it possible to form channels, by the stacking of the exchanger elements, which have widths that differ according to the nature, the flow rate and/or the pressure of the fluid that is to be channeled.

According to one alternative form of the invention, on each face of the plate a lateral rib, which is the rib closest to an edge of the plate, is distant from the corresponding closure bar by approximately 1 times the spacing, and the opposite lateral rib, which is the rib closest to the opposite edge of the plate, is distant from the corresponding closure bar by approximately 2 times the spacing. In this way, an upwardly-facing exchanger element can be alternated with a downwardly-facing identical exchanger element, making it possible to form channels the widths of which differ according to the two faces of the plate.

According to one alternative form of the invention, the ribs of a first face of the plate have a first height, the ribs of the second face of the plate have a second height, the second height differing from the first height. In this way, the ribs can be adapted according to the nature, the flow rate and/or the pressure of a first fluid and of a second fluid having to be channeled.

According to one embodiment of the invention, each rib has a width of between 0.3 mm and 1.6 mm, preferably between 0.4 mm and 1.5 mm, each rib has a height of between 0.8 mm and 2.7 mm, preferably between 1.0 mm and 2.5 mm, and the plate has a thickness of between 0.6 mm and 1.7 mm, preferably between 0.8 mm and 1.5 mm.

Thus, such a rib width gives each rib high mechanical strength, notably making it possible to reduce the risk of the aluminum igniting when a fluid is oxygen because the one-piece exchanger element can be manufactured with a rib width which is greater than in the prior art.

Thus, such a rib width gives the plate high mechanical strength, notably making it possible to reduce the risk of the aluminum igniting when a fluid is oxygen because the one-piece exchanger element can be manufactured with a plate that is thicker than in the prior art.

According to one alternative form of the invention, ribs have cutouts arranged in such a way as to allow intercommunication between consecutive channels. Thus, such cutouts allow calorigenic fluid or frigorigenic fluid to flow between two consecutive channels.

According to an alternative form of the invention, the ribs are arranged in such a way that each channel has a width of between 0.8 mm and 1.2 mm. Thus, such channels allow high flow rates of calorigenic fluid and of frigorigenic fluid to be achieved.

According to one embodiment of the invention, the material of which the one-piece plate, ribs and closure bars is made is selected from the group consisting of copper, copper alloys, a stainless steel, aluminum, aluminum alloys particularly grade 3003, 3004, 3104 and 3005, clad brazing alloys 4004, 4104, 4343, 4045, 4047A and combinations thereof with those of the 3000 family.

Thus, such a material allows an exchange element to be created that is mechanically strong.

According to one alternative form of the invention, the exchanger element comprises braze material applied to ribs and/or to at least one closure bar. As an alternative or in addition, the exchanger element comprises braze material arranged on a face of the plate that does not have ribs, if appropriate. Thus, such braze material can be used to join exchanger elements together in pairs.

According to one embodiment of the invention, ribs extend as a projection on at least one face of the plate, these being parallel to one another so as to form walls of mutually parallel channels referred to as exchange channels.

Thus, such parallel exchange channels allow calorigenic fluid or frigorigenic fluid to be circulated with relatively little by way of pressure losses and over most of the length of the plate.

According to one way of embodying the preceding embodiment, the distribution channels run at angles of between 45° and 90° with respect to the exchange channels.

Thus, such an arrangement of the ribs makes it possible to promote the distribution of calorigenic fluid and of frigorigenic fluid because the pressure drop generated in the region of the exchange channels is greater than the pressure drop generated in each region of the distribution channels.

According to an alternative form of the previous embodiment, the hydraulic diameter of the distribution channels is greater than the hydraulic diameter of the exchange channels. Thus, such hydraulic diameters make the distribution of the calorigenic fluid and frigorigenic fluid easier because the pressure drop generated in the region of the exchange channels is greater than the pressure drop generated in each region of the distribution channels. The hydraulic diameters may vary to suit the exchange channels being supplied (in the case of chemically machined channels).

According to one way of embodying the previous two embodiments:
  the first face of the plate has ribs forming parallel exchange channel walls; and
    the second face of the plate comprises i) ribs forming walls of exchange channels and ii) ribs forming walls of distribution channels which are transverse to the exchange channels.

Thus, such a "hybrid" exchanger element has one face which performs only the function of exchanging heat, whereas the other face also performs a fluid-distribution function.

Moreover, a subject of the present invention is a heat exchanger for a cryogenic gas separation unit, comprising several exchanger elements which are stacked and joined together, for example by means of brazing, so that the plates run parallel to one another, the heat exchanger being characterized in that it comprises several exchanger elements according to the invention, preferably all the exchanger elements are according to the invention.

Thus, such a heat exchanger has very high mechanical strength, allowing it to operate at calorigenic and/or frigorigenic fluid pressures in excess of 50 bar A, even 80 bar A, or even 100 bar A.

According to one way of embodying the previous embodiment, the aforementioned exchanger elements with exchange channels are stacked in alternation with the aforementioned exchanger elements having distribution channels and exchange channels.

In other words, this heat exchanger comprises a stack of exchanger elements of which at least one in two has distribution channels.

Thus, such distribution channels allow the calorigenic fluid or the frigorigenic fluid to be distributed to the exchange channels where the exchange of heat essentially occurs.

Moreover, a subject of the present invention is a method of manufacture, for manufacturing an exchanger element for a heat exchanger intended to transfer heat from at least one primary fluid referred to as a calorigenic fluid to at least one secondary fluid referred to as a frigorigenic fluid, the method of manufacture involving the steps:
- a possible first step of chemically machining certain zones (e.g. distribution) of the plates;
- pressing and moving a tool against at least one face of the plate blank with a pressure that allows the plate blank to be plastically deformed so as to form first ribs forming walls of exchange channels, which run as projections over at least a first face of a plate derived from the plate blank;
- pressing and moving the tool against said at least one first face of the plate blank so as to form ribs that form walls of the distribution channels; and
- plastically deforming the plate blank so as to form closure bars running along the edges of the plate derived from the plate blank.

Thus, such a method of manufacture makes it possible, from a plate blank and rapidly, to manufacture an exchanger element according to the invention which has very high mechanical strength and which has exchange channels and distribution channels.

According to an alternative form of the invention, the plate blank has a thickness in excess of 1 mm. Thus, such a thickness allows the manufacture of a plate with very high mechanical strength, because the plate is relatively thick.

According to one embodiment of the invention, the tool comprises at least two coaxial rollers separated by a distance corresponding to a width of a rib, the rollers rolling along against said at least one face of the plate blank.

Thus, such rollers allow the ribs to be produced accurately and quickly.

The embodiments of the invention and the alternative forms of the invention which have been mentioned hereinabove may be considered in isolation or in any technically feasible combination.

BRIEF DESCRIPTION OF THE DRAWINGS

The present invention will be clearly understood and the advantages thereof will also emerge in the light of the description which will follow, given solely by way of nonlimiting example and made with reference to the attached drawings in which.

DETAILED DESCRIPTION

Figure 1:
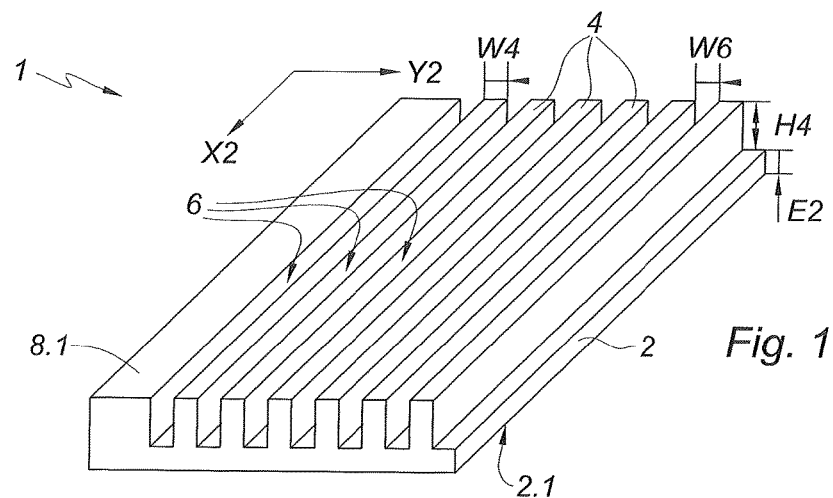
FIG. 1 is a perspective view, showing hidden detail, of part of an exchanger element according to the prior art.

FIG. 1 illustrates part of an exchanger element 1 designed to make up a heat exchanger intended to transfer heat from at least a primary fluid referred to as a calorigenic fluid to at least a secondary fluid referred to as a frigorigenic fluid.

Figures 2, 3:
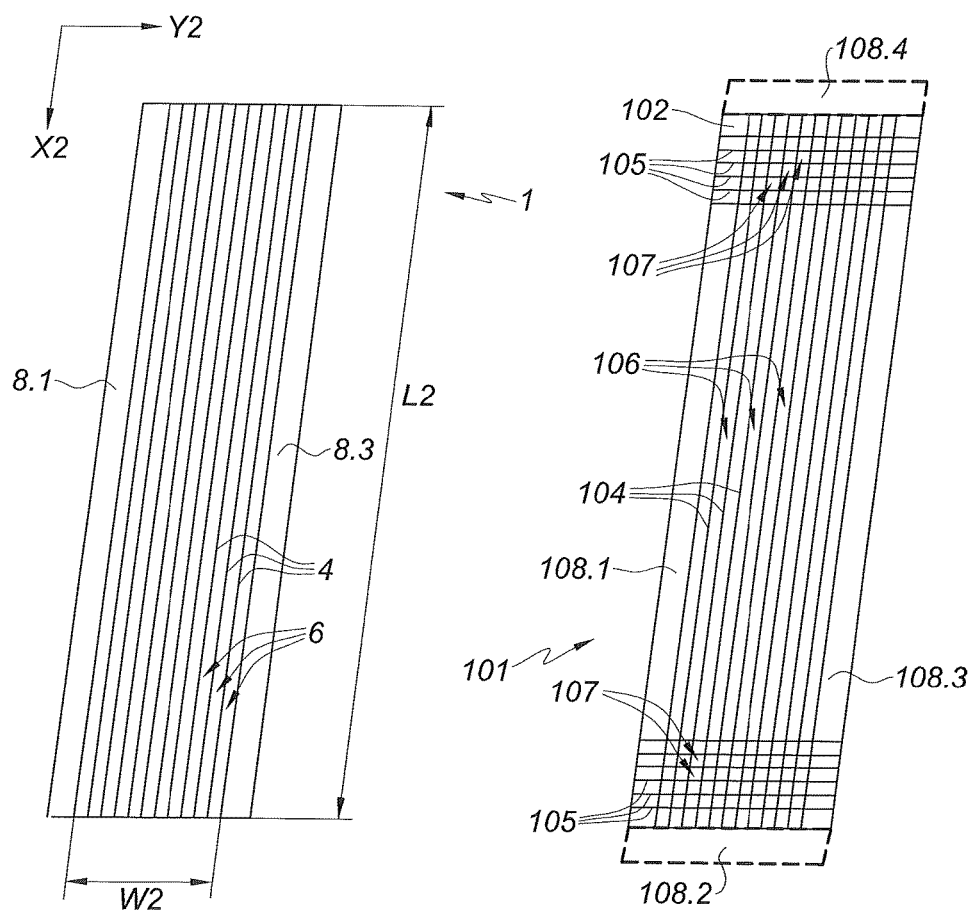
FIG. 2 is a view from above of the exchanger element of FIG. 1.
FIG. 3 is a view similar to FIG. 2 of an exchanger element according to the invention.

As FIGS. 1 and 2 show, the exchanger element 1 comprises a plate 2, ribs 4 and closure bars 8.1 and 8.3. The plate 2, the ribs 4 and the closure bars 8.1 and 8.3 are of one piece. In the example in FIGS. 1 and 2, the plate 2, all the ribs 4 and all the closure bars 8.1 and 8.3 are of one piece. Usually, the ribs are also referred to as "fins". Usually, the plate is also referred to as "base".

In other words, the plate 2, the ribs 4 and the closure bars 8.1 and 8.3 are produced as a single piece and are therefore made up of one single same material. In the example of FIGS. 1 and 2, the material of which the one piece assembly made up of the plate 2, the ribs 4 and the closure bars 8.1 and 8.3 is made is in this instance an aluminum alloy grade 3003.

The plate 2 is solid, flat and in the overall shape of a rectangle. The edges of the plate 2 run respectively in a longitudinal direction X2 and a lateral direction Y2.

The ribs 4 here extend as a projection on just one face of the plate 2. The opposite face 2.1 has no ribs. Each rib 4 forms a portion of a wall of a respective channel 6.

The ribs here have cross sections, in a plane perpendicular to the longitudinal direction X2, which are rectangular and mutually similar.

Each channel 6 is designed for the flow of calorigenic fluid or of frigorigenic fluid. As the ribs 4 run parallel to one another and to the longitudinal direction X2, the channels 6 are parallel to one another and to the longitudinal direction X2.

Each channel 6 is delimited by a rib 4 of the exchanger element 1, by a rib of the adjacent exchanger element and by the plate 2, which defines the "bottom" of the channel 6.

In service, each channel 6 channels calorigenic fluid or frigorigenic fluid, according to whether it is supplied with calorigenic fluid or with frigorigenic fluid. The channels 6 are referred to as exchange channels because they contribute toward performing the function of transferring heat between calorigenic fluid and frigorigenic fluid notably via the plate 2.

As FIG. 2 shows, the exchanger element 1 comprises two closure bars 8.1 and 8.3. The closure bars 8.1 and 8.3 run respectively along two edges of the plate 2. The closure bars 8.1 and 8.3 run parallel to the longitudinal direction X2.

The closure bars 8.1 and 8.3 run along edges of the plate 2 so as to close off the channels 6. The closure bars 8.1 and 8.3 border, and therefore respectively close off, a channel 6 situated close to a lateral edge of the plate 2.

The closure bars 8.1 and 8.3 are arranged here in such a way that all the edges of the plate 2 have a respective closure bar 8.1 and 8.3 running along them. Alternatively, each edge of the plate 2 may have a number of distinct closure bars running along it. As a further alternative, if need be, at least one edge of the plate may have a section of its length with no closure bar running along it.

In addition, in a way that is known per se but has not been depicted, each closure bar may comprise an opening, usually referred to as a "window", for respectively introducing fluid into or removing fluid from the channels.

In the example of FIGS. 1 and 2, the plate 2 has a thickness E2 of around 1.2 mm. Each rib 4 has a width W4 of around 0.5 mm and a height H4 of around 1.8 mm. Each channel 6 has a width W6 of around 1.0 mm.

The plate 2 has a length L2 of around 6 m, measured in the longitudinal direction X2. The plate 2 has a width W2 of around 2.5 m, measured in the transverse direction Y2.

The exchanger element 1 comprises braze material applied to the ribs 4 and to the closure bars 8.1 and 8.3. This braze material forms a layer around 0.1 mm thick. In addition to that, the exchanger element 1 comprises braze material applied to the face 2.1 of the plate 2, namely to the face that has no ribs. These layers of braze material allow several exchanger elements that have been stacked up and heated in a vacuum furnace to be joined together in a way known per se.

FIG. 3 illustrates an exchanger element 101 according to the invention. Insofar as the exchanger element 101 is similar to the exchanger element 1, the description given hereinabove in relation to FIGS. 1 and 2 of the exchanger element 1 can be read across to the exchanger element 101, apart from the notable differences listed hereinafter.

A component of the exchanger element 101 that is identical or corresponds, through its structure or its function, to a component of the exchanger element 1 bears the same numerical reference increased by 100. Thus are defined a plate 102, ribs 104 defining exchange channels 106, and closure bars 108.1, 108.2, 108.3 and 108.4.

The exchanger element 101 differs from the exchanger element 1 notably because the exchanger element 101 has ribs 105 which are arranged, as projections on one face of the plate 102, so as to form walls of second channels referred to as distribution channels 107, so that the distribution channels 107 run transversely to the exchange channels 106. As FIG. 3 shows, the distribution channels 107 run at angles of around 90° with respect to the exchange channels 106.

The arrangement of the ribs 105 prompts the distribution of calorigenic fluid or of frigorigenic fluid because the pressure drop generated in the region of the exchange channels 106 is greater than the pressure drop generated in each region of the distribution channels 107.

In addition, the exchanger element 101 differs from the exchanger element 1 because the exchanger element 101 comprises four closure bars 108.1, 108.2, 108.3, 108.4 which run respectively along the four edges of the plate 102. The closure bars 108.1, 108.2, 108.3, 108.4 are in parallel pairs.

Figure 4:
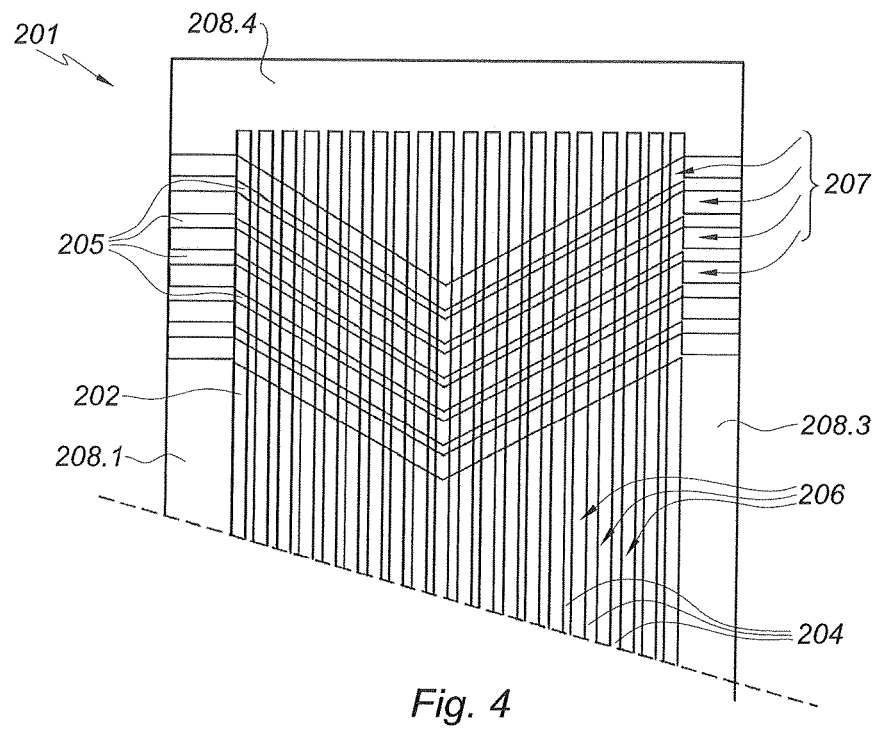
FIG. 4 is a view from above, with truncation, of an exchanger element according to the invention.

FIG. 4 illustrates an exchanger element 201 according to the invention. Insofar as the exchanger element 201 is similar to the exchanger element 101, the description given hereinabove in relation to FIG. 3 of the exchanger element 101 can be read across to the exchanger element 201, with the exception of the notable differences listed hereinafter.

A component of the exchanger element 201 that is identical or corresponds, through its structure or its function, to a component of the exchanger element 101 bears the same numerical reference increased by 100. Thus are defined a plate 202, ribs 204 defining exchange channels 206, and closure bars 208.1, 208.3 and 208.4 and equivalent, depicted in dashed line.

The exchanger element 201 differs from the exchanger element 101 notably because the exchanger element 201 has ribs 205 which are arranged, as projections on one face of the plate 202, so as to form walls of distribution channels 207 so that the distribution channels 207 run at an oblique angle to the exchange channels 206. As FIG. 4 shows, the distribution channels 207 run at angles of around 45° with respect to the exchange channels 206.

The arrangement of the ribs 205 prompts the distribution of calorigenic fluid or of frigorigenic fluid still further because the pressure drop generated in the region of the exchange channels 206 is greater than the pressure drop generated in each region of the distribution channels 207.

In order to feed the exchanger element 201 or the exchanger element 101, a heat exchanger according to the invention further comprises header boxes, not depicted, which are secured, for example by brazing, to respective external faces of the heat exchanger.

Thus, such header boxes allow calorigenic fluid or frigorigenic fluid to be introduced into or let out of the distribution channels 107 or 207 and therefore into or out of the exchange channels 106 or 206.

In the example of FIGS. 3 and 4, the header boxes may be arranged on the longitudinal end portions of the exchanger element 101 or 201 such that these header boxes are fluidically connected to the passages defined by all the distribution channels 107 or 207.

Figure 5:
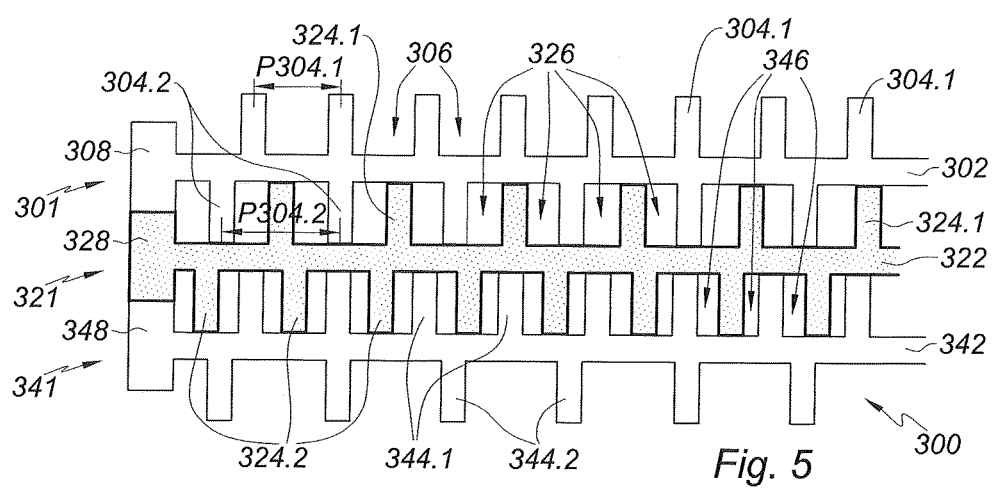
FIG. 5 is a view in cross section of part of a heat exchanger comprising an exchanger element which does not form part of the invention.

FIG. 5 illustrates a heat exchanger 300 to make up a cryogenic gas separation unit which has not been depicted. The heat exchanger 300 comprises several exchanger elements 301, 321, 341, etc., according to the invention, which are stacked up and joined together by brazing.

Insofar as the exchanger element 301, 321 or 341 is similar to the exchanger element 1 or 101, the description given hereinabove in relation to FIG. 1, 2 or 3 of the exchanger element 1 or 101 can be read across to the exchanger element 301, 321 or 341, with the exception of the notable differences listed below.

A component of the exchanger element 301, 321 or 341 that is identical or corresponds, in its structure or its function, to a component of the exchanger element 1 or 101 bears the same reference numeral increased by 100 or 200. Thus are defined plates 302, 322, 342, exchange channels 306, 326, 346 and closure bars 308, 328, 348.

FIG. 5 illustrates a cross section in a plane perpendicular to the longitudinal direction and passing through the middle region of the exchanger elements 301, 321 or 341, namely a region that has only exchange channels 306, 326 and 346. The plates 302, 322, 342 run parallel to one another.

The exchanger element 301, 321 or 341 differs from the exchanger element 101 notably because the exchanger element 301, 321 or 341 has ribs which extend as projections on both faces of the respective plate 302, 322 or 342.

Thus, the exchanger element 301 has ribs 304.1 on a first face and ribs 304.2 on its second face. Likewise, the exchanger element 321 has ribs 324.1 on a first face and ribs 324.2 on its second face, and the exchanger element 341 has ribs 344.1 on a first face and ribs 344.2 on its second face.

In addition, the exchanger element 301, 321 or 341 differs from the exchanger element 101 because the first face of the plate 302, 322 or 342 has ribs forming parallel walls of exchange channels 306. Whereas the second face of the plate 302, 322 or 342 comprises, on the one hand, ribs 304.2, 324.1 forming walls of exchange channels 326 and, on the other hand, ribs which have not been depicted forming walls of distribution channels which are transverse to the exchange channels 326 like the distribution channels 207.

In other words, the heat exchanger 300 comprises a stack of exchanger elements 301, 321, 341 of which one in two has distribution channels similar to the distribution channels 207.

In other words, the exchanger element 301, 321 or 341 is "hybrid" because it has only exchange channels on one face and exchange channels plus distribution channels on the opposite face.

As an alternative to this stack of hybrid exchanger elements, the heat exchanger may comprise exchanger elements with exchange channels which are stacked in alternation with exchanger elements with distribution channels.

In the example of FIG. 5, the ribs 304.1, 324.1 or 344.1 of the first face are offset with respect to the respective ribs 304.2, 324.2 or 344.2 of the second face. In other words, the ribs 304.1, 324.1 or 344.1 of the first face are not situated in line with the respective ribs 304.2, 324.2 or 344.2 of the second face.

On a first face of the plate 302, two consecutive ribs 304.1 are separated by a first spacing P304.1, and on a second face of the plate 302, two consecutive ribs 304.2 are separated by a second spacing P304.2 which is greater than the first spacing P304.1.

In the example of FIG. 5, the second spacing P304.2 is equal to 1.5 times the first spacing. Thus, the channels 306 and 326, after the exchanger elements 301 and 321 have been stacked, have different widths.

In addition, on each face of the plate 302, the lateral rib 304.1 which is the rib closest to the left-hand edge of the plate 301 is spaced away from the corresponding closure bar 308 by around 1 times the spacing P304.1. The opposite lateral rib, not depicted, which is the rib closest to the opposite edge of the plate 302, is distant from the corresponding closure bar, not depicted, by around twice the spacing.

Thus, an upwardly-facing exchanger element 301 can be alternated with a downwardly-facing identical exchanger element such as 321, making it possible to form channels 306 and 326 of widths that differ between the two faces of the plate 302.

In order to manufacture the exchanger element 1, the method of manufacture comprises the following steps:
affixing a mask;
immersing the plates in chemical machining baths;
pressing and moving a tool, not depicted, against one face of the plate blank with a pressure that allows the plate blank to be plastically deformed so as to form the ribs 4 projecting over a face of the plate 2 derived from the plate blank; and
plastically deforming the plate blank so as to form closure bars 8 running along the edges of the plate 2 derived from the plate blank.

The step of plastic deformation of the plate blank is performed by displacing material, without removing material.

According to one step in this manufacturing process, the plate blank has a thickness of around 2 mm.

According to the method of manufacture of the element according to the invention, several passes with different tools are planned, so as to create ribs in successive steps. That allows the plate blank to be deformed gradually, thereby avoiding the risks of splitting and limiting the forces that have to be developed and the stresses on the tools.

In this method, the tool comprises at least two coaxial rollers separated by a distance corresponding to a width W4 of a rib 4. The rollers, not depicted, roll along against the face of the plate blank. All the ribs 4 are created in this way.

According to a similar method of manufacture, for manufacturing the exchanger element 201, the following steps are performed:
pressing and moving the tool against the face of the plate blank so as to form the ribs 204 that are parallel and form walls of the exchange channels 206; and
pressing and moving the tool against this same face of the plate blank so as to form the ribs 205 that form walls of the distribution channels 207.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An exchanger element for a heat exchanger configured to transfer heat from at least one primary fluid referred to as a calorigenic fluid to at least one secondary fluid referred to as a frigorigenic fluid, the exchanger element comprising:
at least one plate which is solid, wherein the at least one plate has the overall shape of a rectangle, wherein the at least one plate having a length, a width, and a height, wherein the length is in the longitudinal direction of the plate, wherein the plate comprises a top section, a lower section, and a middle section;
ribs which extend as a projection on at least one face of the plate, each rib forming at least one portion of a wall of a respective channel designed for the flow of calorigenic fluid or frigorigenic fluid; and
a plurality of closure bars extending along the edges of the plate so as to close off at least part of the channels, wherein the plurality of closure bars includes a top closure bar, a bottom closure bar and a pair of lateral closure bars, wherein the pair of lateral closure bars extend along the length of the plate and the top and bottom closure bars extend along the width of the plate;

wherein the plate, at least part of the ribs and at least part of the closure bars are of one piece, such that the plate, at least part of the ribs and at least part of the closure bars are made of the same material, wherein the ribs include a first ribs and second ribs, wherein the first ribs extend, projecting on at least one first face of the plate, parallel to one another so as to form walls of mutually parallel channels referred to as exchange channels, wherein the second ribs are arranged as projections on the first face of the plate so as to form walls of second channels referred to as distribution channels so that the distribution channels run transversely to the exchange channels, wherein the exchange channels extend along the length of the plate, wherein the exchange channels are disposed in the middle section, wherein the distribution channels are disposed solely in the top section and the lower section such that there is an absence of distribution channels in the middle section, wherein the exchange channels are configured to transfer calorigenic fluid or frigorigenic fluid along the length of the plate, wherein the distribution channels extend along the entire width of the plate and across a portion of the exchange channels and across the pair of lateral closure bars, wherein the distribution channels are configured to transfer calorigenic fluid or frigorigenic fluid across a plurality of the exchange channels such that the calorigenic fluid or frigorigenic fluid moves generally along the width of the plate via the distribution channels and into the plurality of exchange channels.

2. The exchanger element as claimed in claim 1, in which the plate, all the ribs and all the closure bars are of one piece.

3. The exchanger element as claimed in claim 1, in which just one face of the plate comprises ribs.

4. The exchanger element as claimed in claim 1, in which both faces of the plate comprise ribs.

5. The exchanger element as claimed in claim 4, in which the ribs of the first face are offset with respect to the ribs of the second face, the ribs preferably being uniformly distributed over each face.

6. The exchanger element as claimed in claim 1, in which each rib has a width (W4) of between 0.3 mm and 1.6 mm, each rib has a height (H4) of between 0.8 mm and 2.7 mm, in which the plate has a thickness (E2) of between 0.6 mm and 1.7 mm.

7. The exchanger element as claimed in claim 1, in which the material of which the one-piece plate, ribs and closure bars is made is selected from the group consisting of copper; copper alloys; stainless steel; aluminum; aluminum alloys; aluminum alloys selected from the group consisting of 3003, 3004, 3104 and 3005; clad brazing alloys 4004, 4104, 4343, 4045, 4047A and combinations thereof with those of the 3000 family; and combinations thereof.

8. The exchanger element as claimed in claim 1, in which the distribution channels run at angles of between 45° and 90° with respect to the exchange channels.

9. The exchanger element as claimed in claim 1, in which: the first face of the plate has ribs forming parallel exchange channel walls; and the second face of the plate comprises i) ribs forming walls of exchange channels and ii) ribs forming walls of distribution channels which are transverse to the exchange channels.

10. A heat exchanger for a cryogenic gas separation unit, comprising several exchanger elements, comprising at least one plate, which are stacked and joined together, so that the plates run parallel to one another, wherein the heat exchanger comprises several exchanger elements as claimed in claim 1.

11. The heat exchanger as claimed in claim 10, in which exchanger elements as claimed in claim 8 are stacked in alternation with exchanger elements as claimed in claim 9.

12. An exchanger element for a heat exchanger configured to transfer heat from at least one primary fluid referred to as a calorigenic fluid to at least one secondary fluid referred to as a frigorigenic fluid, the exchanger element comprising:

a plate having a generally rectangular shape and having a length, a width, and a height, wherein the plate has a top face and a bottom face, wherein the plate has a top section, a middle section, and a lower section;

a first set of ribs extending upwards from the top face in the direction of the height of the plate, wherein the first set of ribs extend as a projection along the length of the plate, wherein the first set of ribs extend parallel to one another so as to form walls of mutually parallel channels referred to as exchange channels, wherein the exchange channels are configured to transfer the primary fluid or the secondary fluid in the direction of the length of the plate from the top section to the lower section or the lower section to the top section;

a second set of ribs extending upwards from the top face in the direction of the height of the plate, wherein the second set of ribs extend as a projection along the entire width of the plate and across a portion of the exchange channels and across the pair of lateral closure bars, wherein the second set of ribs extend parallel to one another so as to form walls of mutually parallel channels referred to as distribution channels, wherein the distribution channels run transversely to the exchange channels, wherein the distribution channels are disposed solely in the top section and the lower section such that there is an absence of distribution channels disposed within the middle section, wherein the distribution channels are configured to transfer the primary fluid or the secondary fluid generally in the direction of the width of the plate and into the exchange channels; and a plurality of closure bars extending along the edges of the plate so as to close off at least part of the channels, wherein the plurality of closure bars includes a top closure bar, a bottom closure bar and a pair of lateral closure bars, wherein the pair of lateral closure bars extend along the length of the plate and the top and bottom closure bars extend along the width of the plate.

13. The exchanger element as claimed in claim 12, wherein the distribution channels are configured to receive calorigenic fluid or frigorigenic fluid on opposing edges of the plate.

14. The exchanger element as claimed in claim 1, wherein the distribution channels are configured to receive calorigenic fluid or frigorigenic fluid on opposing edges of the plate.

* * * * *